United States Patent [19]

Reeves

[11] 4,199,892
[45] Apr. 29, 1980

[54] FISHING LINE GUIDING DEVICE

[76] Inventor: Lewis G. Reeves, 121 Todd Dr., Bethany Beach, Del. 19930

[21] Appl. No.: 919,031

[22] Filed: Jun. 26, 1978

[51] Int. Cl.² ............................................. A01K 97/00
[52] U.S. Cl. ................................................... 43/43.13
[58] Field of Search .................. 43/43.1, 43.13, 44.9, 43/42.23, 42.35, 42.06, 42.39

[56] References Cited

U.S. PATENT DOCUMENTS

| | | | |
|---|---|---|---|
| 1,611,644 | 12/1926 | Johnson | 43/42.06 |
| 1,645,874 | 10/1927 | Sanford | 43/43.13 |
| 1,708,825 | 9/1929 | Barclay | 43/42.06 |
| 2,605,576 | 8/1952 | Young | 43/43.1 |
| 2,817,180 | 12/1957 | Thomas | 43/42.06 |
| 3,440,756 | 4/1969 | Leadbetter | 43/42.06 |
| 3,453,768 | 7/1969 | Feaster | 43/43.13 X |

*Primary Examiner*—Nicholas P. Godici

[57] ABSTRACT

This device is for the purpose of taking the place of sinkers, planes, and trigger equipment, and it consists primarily of a cylinder, having an air pocket on one side and an oppositely opposed pocket therein contains lead. The device includes a plurality of spaced-apart and elongated openings for receiving an eyelet, which is attached to the fishing line, and a leader is attached to the eyelet for holding the bait or lure.

2 Claims, 3 Drawing Figures

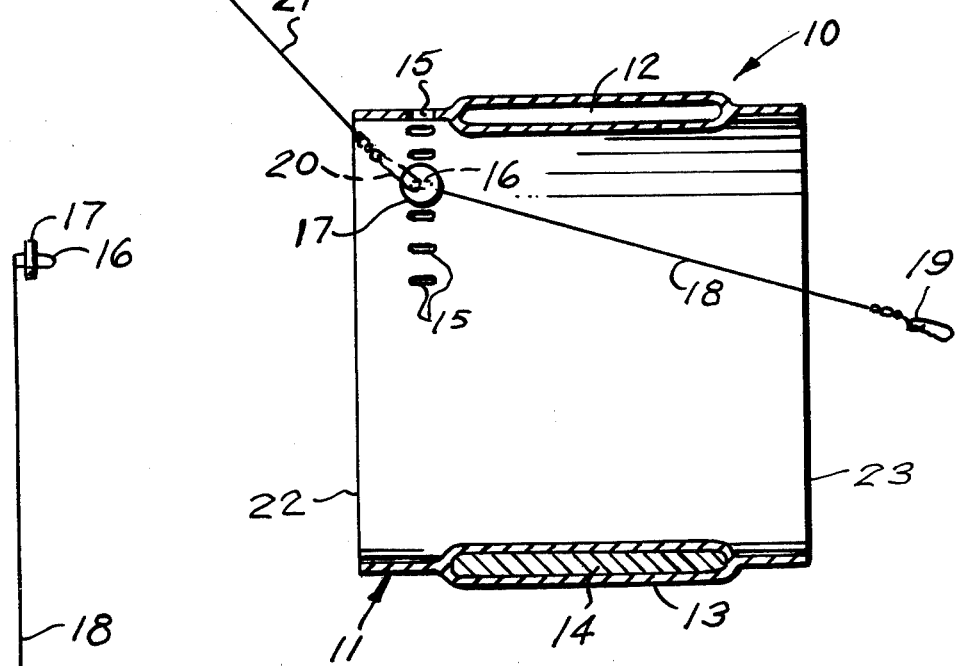
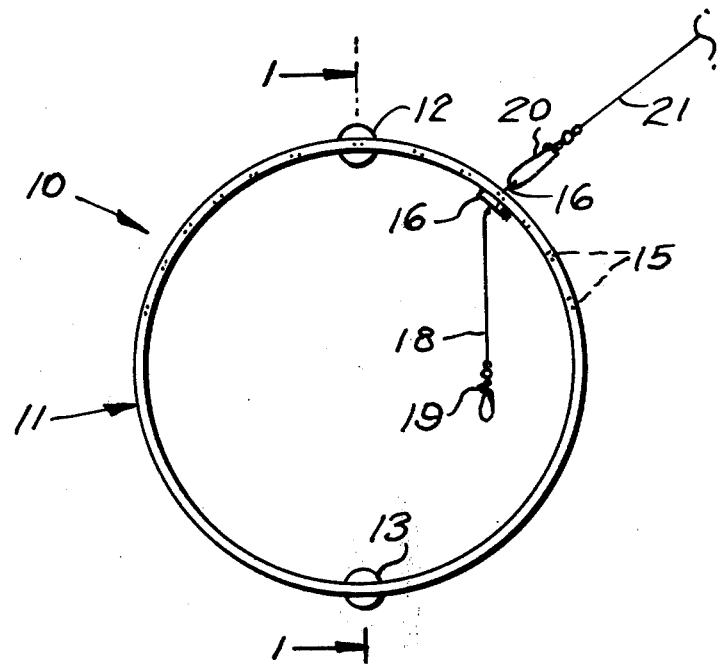

FISHING LINE GUIDING DEVICE

This invention relates to angling devices, and more particularly, to a fishing line guiding device.

It is, therefore, the principal object of this invention to provide fishing line guiding device, which will take the place of sinkers, planes, and triggering devices, that are well known in the art.

Another object of this invention is to provide a fishing line guiding device, which will be adaptable for use with various lures.

A further object of this invention is to provide a fishing line guiding device, which will have a plurality of elongated adjustment openings so as to give the desired deflection when the device is in use.

Other objects of the invention are to provide a fishing line guiding device, which is simple in design, inexpensive to manufacture, rugged in construction and efficient in use.

These, and other objects, will become readily evident, after a study of the following specification and the accompanying drawing, wherein:

FIG. 1 is a cross-sectional view, taken along the line 1—1 of FIG. 2;

FIG. 2 is an end view of the present invention, shown in elevation, and

FIG. 3 is a plan view of the leader, shown removed from the invention.

According to this invention, device 10 is shown to include a hollow cylinder 11, made of suitable material, which has a hollow pocket 12 molded integral of the wall, and extending longitudinally of cylinder 11. A similar pocket 13 is filled with lead 14, for weighting purposes.

A plurality of equally spaced-apart openings 15, of elongated configuration, through cylinder 11, provide a means of receiving the eyelet 16 of a retaining washer 17. The eyelet 16 may be placed in any one of the openings 15, as desired. A leader 18 is fixedly secured to the eyelet 16, and is provided, at its opposite end, with a snap-swivel 19, for the placement of a lure or bait. A snap-swivel 20 is received in eyelet 16, and is secured to fishing line 21. As is readily seen in FIG. 1, edge 22 is the leading edge, and 23 is the trailing edge.

In use, the eyelet 16 is inserted into any one of the openings 15, that will provide the desired deflection. The line 21 is secured to the reel of the fishing pole. The snap-swivel 19 is attached to the lure or bait, and extends from the trailing edge 23. The aforementioned enables all the strain, caused by varying amounts of drag from different types of lures, to be placed directly on the fastening point of the line, and eliminates any unwanted steering effect, when trolling for fish.

It shall be noted, that device 10 may be used for trolling from a moving boat, or may be used in a moving body of water, such as a river or stream, from a stationary position.

While various changes may be made in the detail construction, it is understood that such changes will be within the spirit and scope of the present invention as is defined by the appended claims.

What I now claim is:

1. A fishing line guiding device, comprising, in combination, a hollow cylinder having a central opening extending axially therethrough, an axially extending elongated weight along a side of said cylinder, and an elongated airspace chamber formed along a diametrically opposite side of said cylinder, a plurality of slot-shaped openings through a wall of said cylinder arranged in a row extending a part way around said cylinder and located near one end thereof, and a fishing line assembly adjustably attachable to said cylinder by a selection of said openings.

2. The combination as set forth in claim 1, wherein said fishing line assembly comprises a fishing line, which, at one end, extends in the water, a first snap-swivel secured to said end, an eyelet unit removably hooked to said first snap-swivel, a leader attached, at one end, to said eyelet unit, and an opposite end of said leader secured to a second snap-swivel, for attachment to a lure or bait, said eyelet unit including an eyelet element and a washer element and a washer element integral therewith, said eyelet element being inserted through a selected one of said cylinder openings with said washer element abutting against an inner side of said cylinder wall.

* * * * *